(12) United States Patent
Wang

(10) Patent No.: US 10,554,965 B2
(45) Date of Patent: Feb. 4, 2020

(54) MOTION-COMPENSATED PARTITIONING

(71) Applicant: Google Inc., Mountain View, CA (US)

(72) Inventor: Yunqing Wang, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 1161 days.

(21) Appl. No.: 14/461,520

(22) Filed: Aug. 18, 2014

(65) Prior Publication Data

US 2016/0050411 A1  Feb. 18, 2016

(51) Int. Cl.
*H04N 19/583* (2014.01)

(52) U.S. Cl.
CPC .............................. *H04N 19/00733* (2013.01)

(58) Field of Classification Search
None
See application file for complete search history.

(56) References Cited

U.S. PATENT DOCUMENTS

| | | |
|---|---|---|
| 5,351,086 A | 9/1994 | Park |
| 5,384,865 A | 1/1995 | Loveridge |
| 5,452,104 A | 9/1995 | Lee |
| 5,801,778 A | 9/1998 | Ju |
| 6,072,904 A | 6/2000 | Desai et al. |
| 6,072,905 A | 6/2000 | Cucchi et al. |
| 6,233,017 B1 | 5/2001 | Chaddha |
| 6,466,624 B1 | 10/2002 | Fogg |
| 6,487,313 B1 | 11/2002 | De Haan et al. |
| 6,529,634 B1 | 3/2003 | Thyagarajan et al. |
| 6,560,366 B1 | 5/2003 | Wilkins |
| 6,741,655 B1 | 5/2004 | Chang et al. |
| 6,996,283 B2 | 2/2006 | Thyagarajan |
| 7,027,654 B1 | 4/2006 | Ameres et al. |
| 7,085,401 B2 | 8/2006 | Averbuch et al. |

(Continued)

FOREIGN PATENT DOCUMENTS

| | | |
|---|---|---|
| EP | 0477616 A2 | 4/1992 |
| EP | 0634873 A2 | 1/1995 |

(Continued)

OTHER PUBLICATIONS

"Overview of the H.264/AVC Video Coding Standard", Thomas Wiegand, Gary J. Sullivan, Senior Member, IEEE, Gisle Bjøntegaard, and Ajay Luthra, Senior Member, IEEE Transactions on Circuits and Systems for Video Technology, vol. 13, No. 7, Jul. 2003.*

(Continued)

*Primary Examiner* — Xiaolan Xu
(74) *Attorney, Agent, or Firm* — Young Basile Hanlon & MacFarlane, P.C.

(57) ABSTRACT

A method and apparatus for video coding using motion-compensated partitioning is provided. Video coding using motion-compensated partitioning may include identifying a current block of a current frame of an input video stream, generating an encoded block by encoding the current block using motion-compensated partitioning, wherein encoding the current block using motion-compensated partitioning includes, generating coarse motion estimation information for the current block, partitioning the current block, generating fine motion estimation information for the current block, and transmitting or storing the encoded block.

3 Claims, 10 Drawing Sheets

(56) References Cited

U.S. PATENT DOCUMENTS

| | | |
|---|---|---|
| 7,260,148 B2 | 8/2007 | Sohm |
| 7,343,044 B2 | 3/2008 | Baba et al. |
| 7,697,769 B2 | 4/2010 | Baba et al. |
| 7,809,212 B2 | 10/2010 | Tulkki |
| 8,045,620 B2 | 10/2011 | Oshikiri et al. |
| 8,064,644 B2 | 11/2011 | Kokaram |
| 8,229,174 B2 | 7/2012 | Kokaram |
| 8,385,418 B2 | 2/2013 | Crawford et al. |
| 8,611,415 B1 | 12/2013 | Xu et al. |
| 8,761,261 B1 * | 6/2014 | Wang ............... H04N 19/139 375/240.16 |
| 2001/0014124 A1 | 8/2001 | Nishikawa |
| 2002/0003575 A1 | 1/2002 | Marchese |
| 2002/0044693 A1 | 4/2002 | Ogawa |
| 2003/0012281 A1 | 1/2003 | Cho et al. |
| 2003/0053544 A1 | 3/2003 | Yasunari et al. |
| 2005/0013367 A1 | 1/2005 | Gallant et al. |
| 2005/0286635 A1 | 12/2005 | Kumar et al. |
| 2006/0018381 A1 | 1/2006 | Luo et al. |
| 2006/0062481 A1 | 3/2006 | Suvanto |
| 2006/0176316 A1 | 8/2006 | Nagasaki et al. |
| 2006/0245499 A1 | 11/2006 | Chiu et al. |
| 2008/0002772 A1 | 1/2008 | Song et al. |
| 2009/0080523 A1 | 3/2009 | McDowell |
| 2009/0122866 A1 | 5/2009 | Crawford et al. |
| 2012/0044998 A1 | 2/2012 | Kokaram |
| 2012/0213280 A1 | 8/2012 | Srinivasan et al. |
| 2013/0251279 A1 | 9/2013 | Park et al. |
| 2013/0271666 A1 | 10/2013 | Crawford et al. |
| 2014/0146884 A1 * | 5/2014 | Cho ................ H04N 19/00569 375/240.12 |

FOREIGN PATENT DOCUMENTS

| | | |
|---|---|---|
| EP | 0986252 A1 | 3/2000 |
| EP | 1854067 A2 | 11/2007 |
| EP | 1864502 A2 | 12/2007 |
| GB | 2307133 A | 5/1997 |
| GB | 2365244 A | 2/2002 |
| WO | 9922520 A2 | 5/1999 |
| WO | WO2004056089 A2 | 7/2004 |
| WO | 2004082294 A1 | 9/2004 |
| WO | 2006072925 A2 | 7/2006 |
| WO | 2016028453 A1 | 2/2016 |

OTHER PUBLICATIONS

VP6 Bitstream & Decoder Specification. Version 1.02. On2 Technologies, IxNC. Dated Aug. 17, 2006.
VP6 Bitstream & Decoder Specification. Version 1.03. On2 Technologies, IxNC. Dated Oct. 29, 2007.
VP8 Data Format and Decoding Guide. WebM Project. Google On2. Dated: Dec. 1, 2010.
Wiegand, Thomas, et al.; Long-Term Memory Motion-Compensated Prediction, date unknown.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wright, R. Glenn, et al.; "Multimedia—Electronic Technical Manual for ATE", IEEE 1996, 3 pp.
Zhang, Kui, et al.; "Variable Block Size Video Coding With Motion Prediction and Motion Segmentation", SPIE vol. 2419, 1995, 9 pp.
Bankoski et al. "Technical Overview of VP8, An Open Source Video Codec for the Web". Dated Jul. 11, 2011.
Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Black, et al. "Robust Dynamic Motion Estimation Over Time", IEEE Computer Society ConferexNCe on Computer Vision and Pattern Recognition, pp. 296-302, 1991.
Chen, Michael C., et al.; "Design and Optimization of a Differentially Coded Variable Block Size Motion Compensation System", IEEE 1996, 4 pp.
Chen, Xing C., et al.; "Quadtree Based Adaptive Lossy Coding of Motion Vectors", IEEE 1996, 4 pp.
Crawford, et al., "Gradient based dominant motion estimation with integral projections for real time video stabilization", 2004 International ConferexNCe of Image Processing (ICIP) Oct. 24-27, 2004 vol. 5 pp. 3371-3374.
Dirk Robinson and Peyman Milanfar. Fast local and global projection-based methods for affine motion estimation. Journal of Mathematical Imaging and Vision, 18:35-54, 2003.
Ebrahimi, Touradj, et al.; "Joint motion estimation and segmentation for very low bitrate video coding", SPIE vol. 2501, 1995, 12 pp.
Elias, D.P. and N.G. Kingsbury. An efficient block segmentation algorithm for true motion estimation. In Sixth IEEE International ConferexNCe on Image Processing and Its Applications, vol. 1, pp. 209-213. IEEE ConferexNCe Publications 443, Jul. 14-17, 1997.
F. Dufaux and J. Konrad. Efficient, robust and fast global motion estimation for video coding. IEEE Transactions on Image Processing, 9:497-501, 2000.
Ghanbari, M., The cross-search algorithm for motion estimation. IEEE Transactions on Communication, 38:950-953, Jul. 1990.
Guillotel, Philippe, et al.; "Comparison of motion vector coding techniques", SPIE vol. 2308, 1994, 11 pp.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
J. H. Lee and J. B. Ra. Block Motion estimation based on selective integral projections. In IEEE ICIP, vol. I, pp. 689-693, 2002.
J-M. Odobez and P. Bouthemy. Robust multiresolution estimation of parametric motion models. Journal of visual communication and image representation, 6:348-365, 1995.
Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.
Kelly, et al. "Graphics Hardware for Gradient Based Motion Estimation", Proceedings of SPIE—IS&T Electronic Imaging, vol. 5309, No. 1, pp. 92-103, 2004.
Kim, Jong Won, et al.; "On the Hierarchical Variable Block Size Motion Estimation Technique for Motion SequexNCe Coding", SPIE Visual Communication and Image Processing 1993, Cambridge, MA, Nov. 8, 1993, 29 pp. (Abstract only).
Kokaram, et al. "A System for Reconstruction of Missing Data in Image SequexNCes Using Sampled 3D AR Models and MRF Motion Priors", Computer Vision-ECCV '96. 4th European ConferexNCe on Computer Proceedings, vol. 2, pp. 613-624, 1996.
Kokaram, et al. "Automated Rig Removal with Bayesian Motion Interpolation", IEEE ConferexNCe Publication; 1st European conferexNCe on Visual Media Production, pp. 155-164, 2004.
Kokaram. AC, Motion Picture Restoration: Digital Algorithms for Artefact Suppression in Degraded Motion Picture Film and Video. Springer Verlag, ISBN 3-540-76040-7, pp. 13-46. 1998.
Liu, Bede, et al.; "A simple method to segment motion field for video coding", SPIE vol. 1818, Visual Communications and Image Processing 1992, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Martinez. D.M, Model-based motion estimation and its application to restoration and interpolation of motion pictures. PhD thesis, Massachusetts Institute of Technology, 1986.

(56) References Cited

OTHER PUBLICATIONS

Mozilla, "Introduction to Video Coding Part 1: Transform Coding", Video Compression Overview, Mar. 2012, 171 pp.
Nicolas, H., et al.; "Region-based motion estimation using deterministic relaxation schemes for image sequexNCe coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Orchard, Michael T.; "Exploiting Scene Structure in Video Coding", IEEE 1991, 5 pp.
Orchard, Michael T.; "Predictive Motion-Field Segmentation for Image SequexNCe Coding", IEEE Transactions on Circuits and Systems for Video Technology, vol. 3, No. 1, Feb. 1993, 17 pp.
Overview; VP7 Data Format and Decoder. Version 1.5. On2 Technologies, IxNC. Dated Mar. 28, 2005.
P. Bouthemy, M. Gelgon, and F. Ganansia. A unified approach to shot change detection and camera motion characterization. IEEE Transactions on Circuits and Systems for Video Technology, 9:1030-1044, 1999.
P. Milanfar. A model of the effect of image motion in the radon transform domain. IEEE Trans. on Image Processing, 8 (9):1276-1281, 1999.
P.H.S. Torr. Geometric motion segmentation and model selection. Philosophical Transactions of the Royal Society A, pp. 1321-1340, 1998.
Schiller, H., et al.; "Efficient Coding of Side Information in a Low Bitrate Hybrid Image Coder", Signal Processing 19 (1990) Elsevier SciexNCe Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Seferidis, V. and M. Ghanbari. Heirarchical motion estimation using texture analysis. In IEEE 4th ConferexNCe on Image Processing, pp. 61-64, 1992.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Konzali W. et al. A Quadree-Structured Variable Block Size for H264 Motion Estimation, 24 Picture Coding Symposium, Dec. 15, 2004, San Fransisco.
Puri A, et al., Interframe coding with variable block-size motion compensation, Global Telecommunications Conference, Tokyo, Nov. 15, 1987, IEEE, US, vol. 1, pp. 1.7.01-2.7.05.
Besag. J., On the statistical analysis of dirty pictures. Journal of the Royal Statistical Society B, 48:259-302, 1986.
Biemond, J., L. Looijenga, and D.E. Boekee. A pel-recursive Wiener-based displacement estimation algorithm. Signal Processing, 1987.
Bierling, M., Displacement estimation by heirarchical block matching. In SPIE VCIP, pp. 942-951, 1988.
Black, M.J., and P. Anandan. A framework for the robust estimation of optical flow. In Fourth International Conf. on Computer Vision, pp. 231-236, May 1993.
Boroczy, L., J.N. Driessen, and J. Biemond. Adaptive algorithms for pel-recursive displacement estimation. In Proceedings SPIE VCIP, pp. 1210-1221, 1990.
Chen, M-J, et al., Fast variable block-size motion estimation by merging refined motion vector for H.264, IEICE Transactions on Communications, Communications Society, Tokyo, JP, vol. E89B, No. 10, Oct. 1, 2006 pp. 2922-2928.
Denman, H., N. Rea, and A. Kokaram. Content based analysis for video from snooker broadcasts. In International Conference on Image and Video Retrieval CIVR2002, Jul. 18-19, 2002.
Higgins. H. The interpretation of a moving retinal image. Proceedings of the Royal Society, London, B 208:385-397, 1980.
Higgins. H., The visual ambiguity of a moving plane. Proceedings of the Royal Society, London, B 223:165-175, 1984.
Horn and B. Schunck. Determining optical flow. Artificial Intelligence, 17:185-203, 1981.
International Search Search Report & Written Opinion, RE: Application #PCT/US2015/042594 (citing new art); dated Nov. 25, 2015.
J.-S. Kim and R.-H. Park. A fast feature-based block matching algorithm using integral projections. IEEE J. Selected Areas in Communications, 10(5):986-971, Jun. 1992.
Kim et al., "Mapping parameter estimation using integral projections and segmented moving objects in object-oriented analysis-synthesis coding"; Optical Engineering 35(1), p. 156-165 (Jan. 1996).
Kokaram, A, R. Dahoyt, F. Pitie, and H. Denman. Simultaneous luminance and position stabilization for film and video. In Visual Communications and Image Processing, San Jose, California USA, Jan. 2003.
Kokaram. "On Missing Data Treatment for Degraded Video and Film Archives: A Survey and a New Bayesian Approach", IEEE Transactions on Image Processing, vol. 13, No. 3, pp. 397-415, 2004.
Kokoram, A, and P. Delacourt. A new global estimation algorithm and its application to retrieval in sports events. In IEEE International Workshop on Multimedia Signal Processing, MMSP '01, pp. 3-5, Oct. 2001.
Murat A. Tekalp, "Block-Based Methods", Digital Video Processing, Prentice Hall Processing Series, Aug. 12, 1995, pp. 98-116, Prentice Hall PTRMurat, A. Tekalp. Digital Video Processing. pp. 72-94, 177-197. Prentice Hall, 1995.

\* cited by examiner

MOTION-COMPENSATED PARTITIONING

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Accordingly, it would be advantageous to provide high resolution video transmitted over communications channels having limited bandwidth.

SUMMARY

This application relates to encoding and decoding of video stream data for transmission or storage. Disclosed herein are aspects of systems, methods, and apparatuses for encoding and decoding using motion-compensated partitioning.

An aspect is a method for video coding using motion-compensated partitioning. Video coding using motion-compensated partitioning may include identifying a current block of a current frame of an input video stream, generating an encoded block by encoding the current block using motion-compensated partitioning, and transmitting or storing the encoded block. Encoding the current block using motion-compensated partitioning may include generating coarse motion estimation information for the current block, partitioning the current block, and generating fine motion estimation information for the current block.

Another aspect is a method for video coding using motion-compensated partitioning. Video coding using motion-compensated partitioning may include identifying a current block of a current frame of an input video stream, generating an encoded block by encoding the current block, and transmitting or storing the encoded block. Encoding the current block may include motion-compensated partitioning the current block.

Another aspect is a method for video coding using motion-compensated partitioning. Video coding using motion-compensated partitioning may include identifying a current block of a current frame of an input video stream, generating an encoded block by encoding the current block, and transmitting or storing the encoded block. Encoding the current block may include generating coarse motion estimation information for the current block, wherein the current block is a N×N size block, and wherein generating coarse motion estimation information for the current block includes dividing the current block into a plurality of K×K basic blocks, where N is a multiple of K, and generating motion information and prediction error information for each respective basic block from the plurality of basic blocks by performing coarse motion searching for each respective basic block. Encoding the current block may include determining a partitioning scheme from a plurality of candidate partitioning schemes, wherein each candidate partitioning scheme from the plurality of candidate partitioning schemes includes at least one candidate from a plurality of candidate partitions for the current block, wherein determining the partitioning scheme includes generating a partitioning decision tree including a plurality of nodes, wherein each node from the plurality of nodes represents a candidate partition from the plurality of candidate partitions, and traversing the partitioning decision tree in a depth-first order, wherein traversing the partitioning decision tree in a depth-first order includes, identifying a first node from the plurality of nodes, the first node having a plurality of child nodes from the plurality of nodes, wherein each child node is a leaf node, each leaf node representing a respective basic block size partition from the plurality of partitions, determining node information for the first node by evaluating a plurality of partitioning criteria based on each child node from the plurality of child nodes, and pruning the partitioning decision tree, wherein pruning the partitioning decision tree includes removing a child node of a first node on a condition that partitioning information for the first node indicates no partitioning for the first node. Encoding the current block may include partitioning the current block using the partitioning scheme, and generating fine motion estimation information for the current block, wherein generating fine motion estimation information for the current block includes generating sub-pixel motion information for each partition from the partitioning scheme, and determining a prediction mode for each partition from the partitioning scheme.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video may be used for various purposes including, for example, remote business meetings via video conferencing, high definition video entertainment, video advertisements, and sharing of user-generated videos. Digital video streams may represent video using a sequence of frames or images. Each frame can include a number of blocks, which may include information indicating pixel attributes, such as color values or brightness. Transmission and storage of video can use significant computing or communications resources. Compression and other coding techniques may be used to reduce the amount of data in video streams.

Encoding a video stream, or a portion thereof, such as a frame or a block, can include using temporal and spatial similarities in the video stream to improve coding efficiency. For example, video coding may include predicting pixel values based on temporal and spatial similarities between pixels. One form of prediction is inter-prediction, which can include predicting values for a portion of a current frame based on one or more reference frames by performing motion searching to find a similar portion in the reference frame. In some implementations of prediction coding, one or more frames of a video sequence can be partitioned into multiple partitions, and motion searching can be performed for each respective partition. In some implementations, multiple partitioning schemes may be evaluated and the partitioning scheme generating the least error may be considered the optimal partitioning scheme and may be used for encoding the frame.

In some implementations of motion-compensated partitioning, an optimal partitioning scheme may be identified using a two stage process, which may include a basic block motion search, a post-order depth-first traversal order partitioning decision, and a selective sub-pixel motion search. The basic block motion search may include generating motion information and prediction error information for each basic block in a frame, or a portion of a frame. The post-order depth-first traversal order partitioning decision may include generating a partition tree and traversing the partition tree to generate a pruned partition tree representing the optimal partitioning scheme. The sub-pixel motion search may include traversing the pruned partition tree in depth-first order to generate sub-pixel motion information and identify an optimal coding mode for the respective partition.

Figure 1:
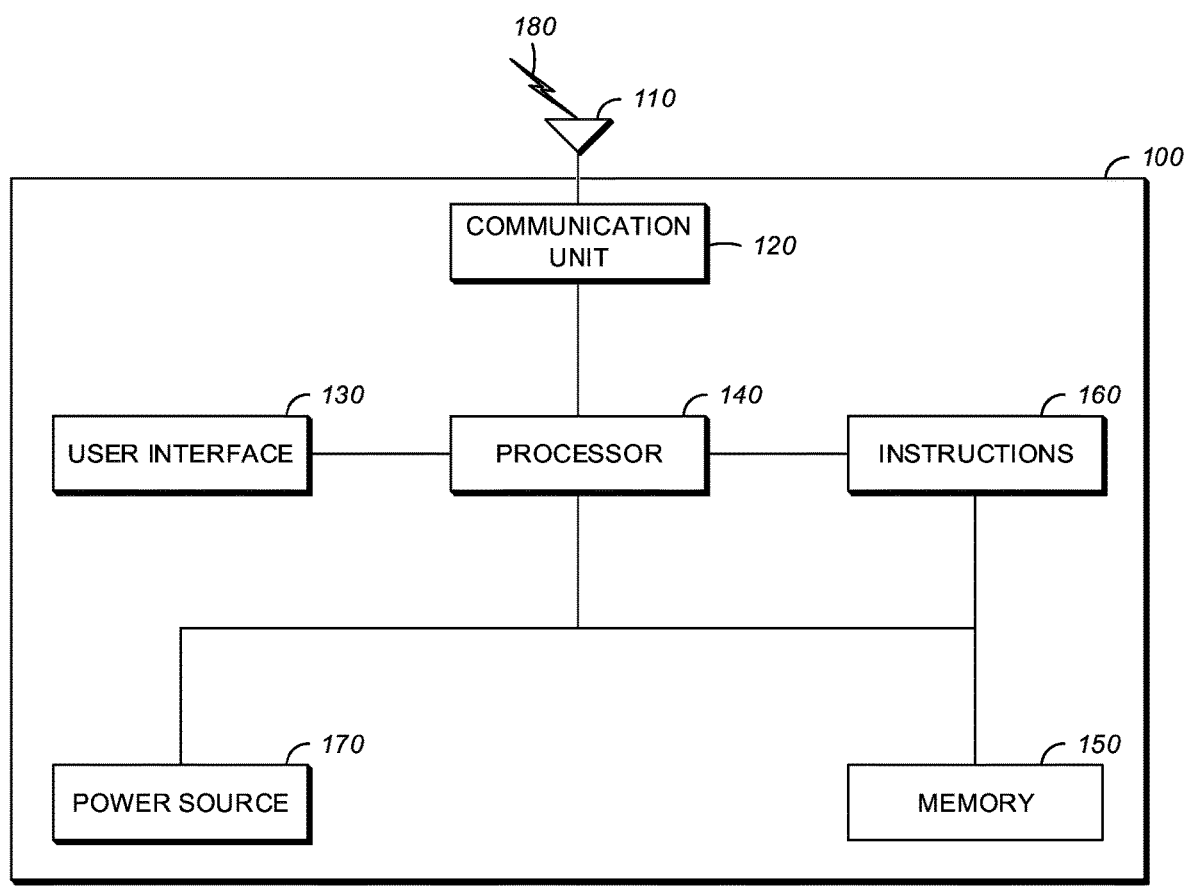
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
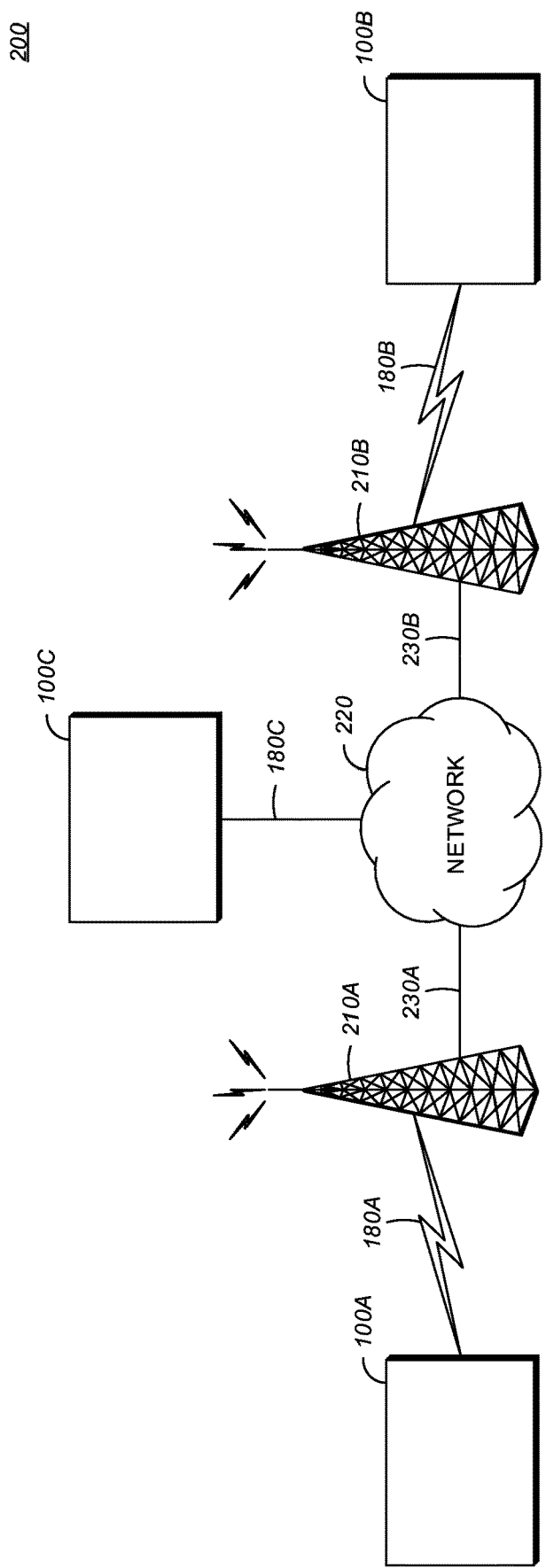
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
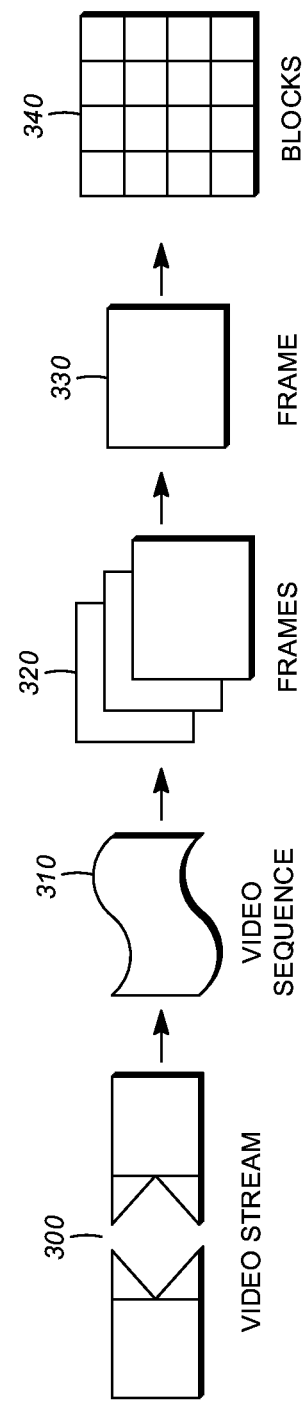
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
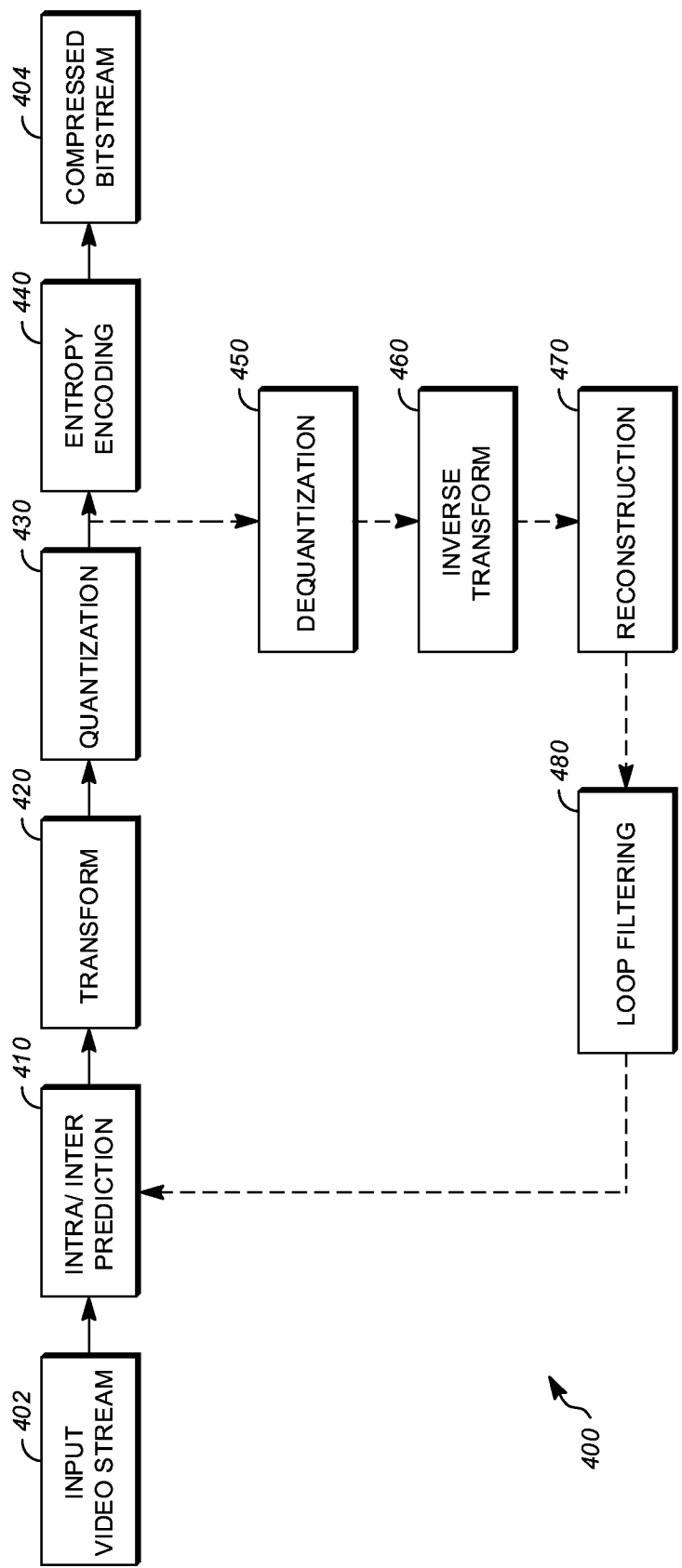
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
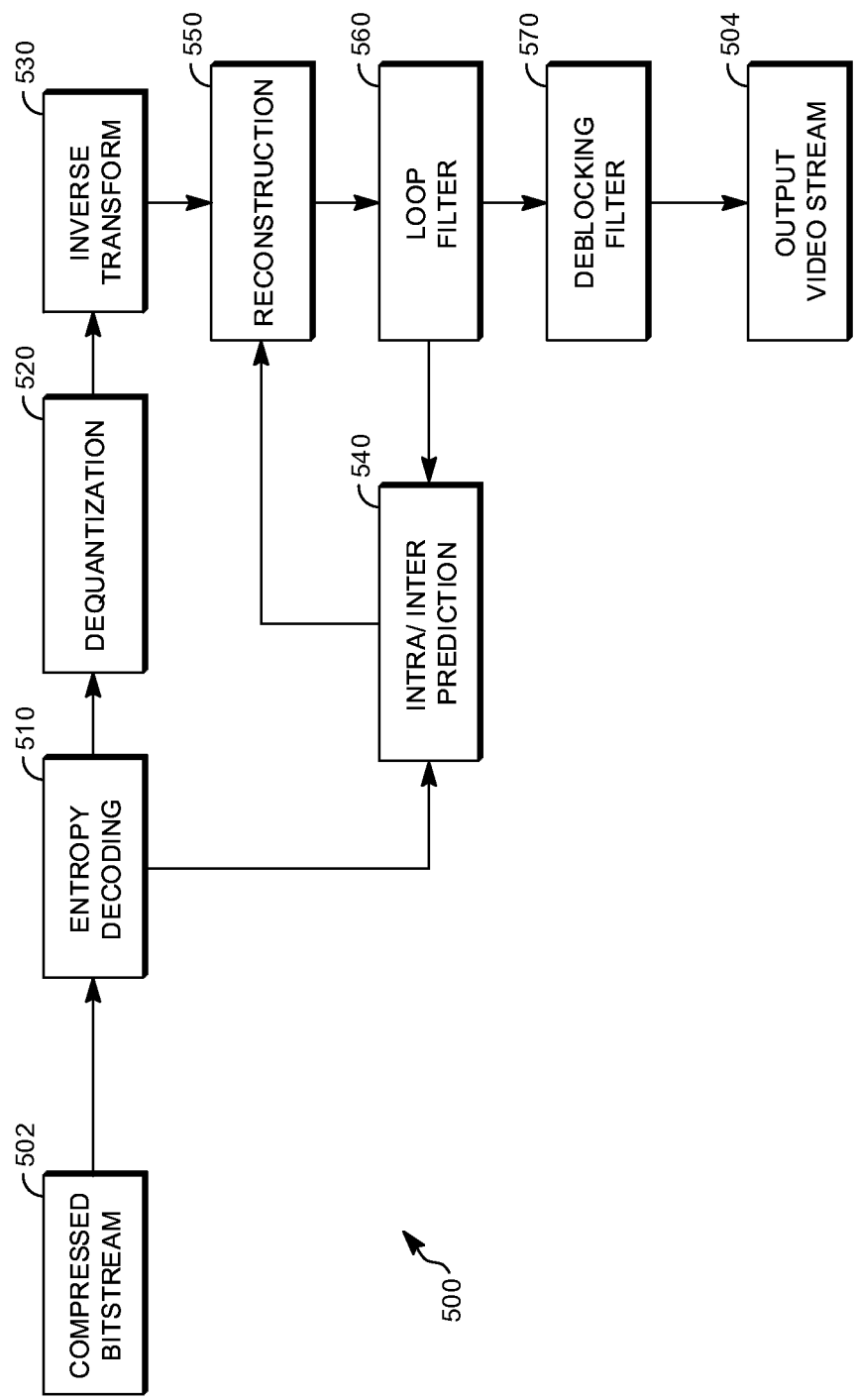
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transformation unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
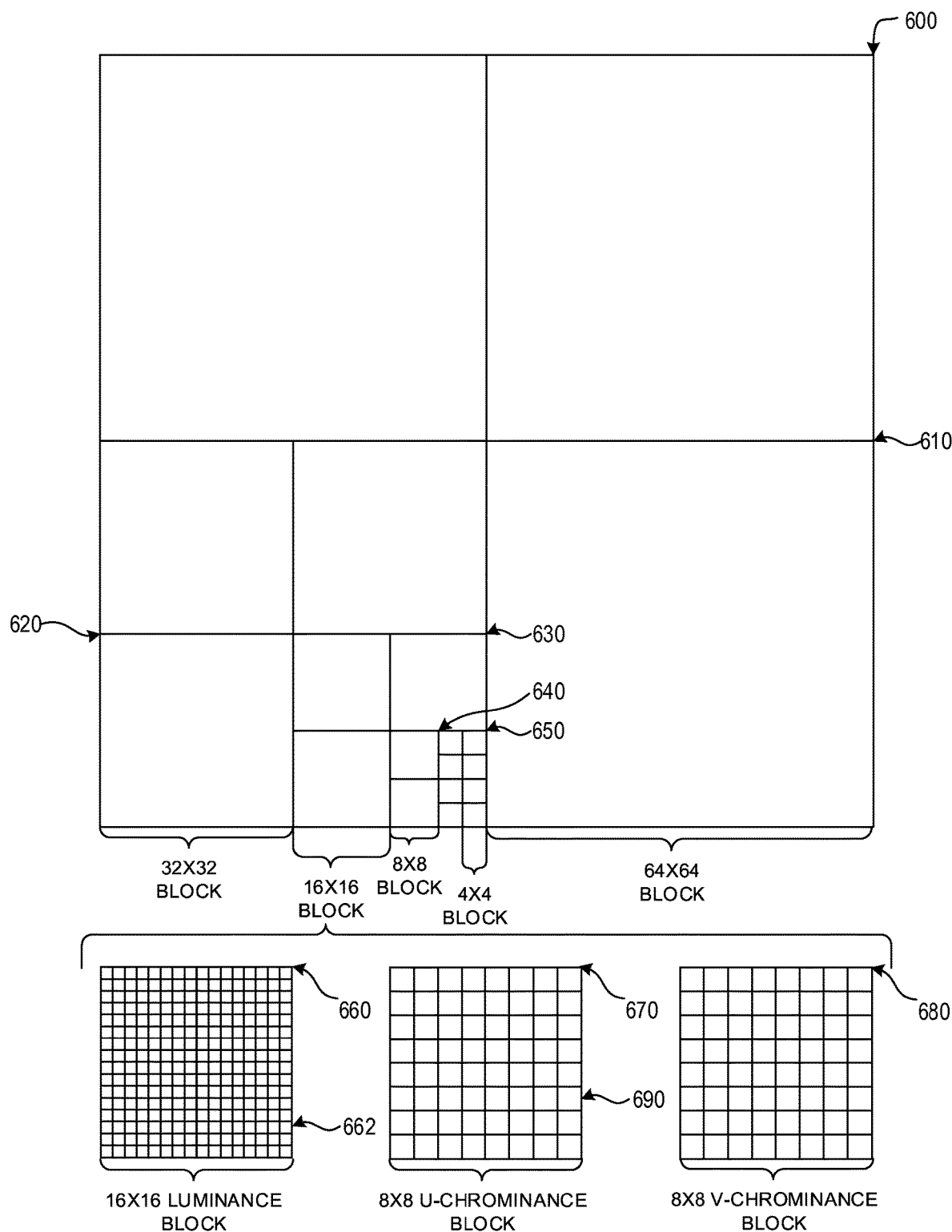
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670/680, such as a U or Cb chrominance block 670, and a V or Cr chrominance block 680. The chrominance blocks 670/680 may include chrominance pixels 690. For example, the luminance block 660 may include 16×16 luminance pixels 662 and each chrominance block 670/680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×z32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a block or pixel in a reference frame, or a portion of the reference frame, that corresponds with a current block or pixel of a current frame. For example, a reference frame, or a portion of a reference frame, which may be stored in memory, may be searched for the best block or pixel to use for encoding a current block or pixel of the current frame. For example, the search may identify the block of the reference frame for which the difference in pixel values between the reference block and the current block is minimized, and may be referred to as motion searching. In some implementations, the portion of the reference frame searched may be limited. For example, the portion of the reference frame searched, which may be referred to as the search area, may include a limited number of rows of the reference frame. In an example, identifying the reference block may include calculating a cost function, such as a sum of absolute differences (SAD), between the pixels of the blocks in the search area and the pixels of the current block.

In some implementations, the spatial difference between the location of the reference block in the reference frame and the current block in the current frame may be represented as a motion vector. The difference in pixel values between the reference block and the current block may be referred to as differential data, residual data, or as a residual block. In some implementations, generating motion vectors may be referred to as motion estimation, a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although motion-compensated partitioning is described herein with reference to matrix or Cartesian representation of a frame for clarity, a frame may be stored, transmitted, processed, or any combination thereof, in any data structure such that pixel values may be efficiently predicted for a frame or image. For example, a frame may be stored, transmitted, processed, or any combination thereof, in a two dimensional data structure such as a matrix as shown, or in a one dimensional data structure, such as a vector array. In an implementation, a representation of the frame, such as a two dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, the content captured within a block may include two or more areas that exhibit distinct spatial and temporal characteristics. For example, a frame may capture multiple objects moving in various directions and speeds, and a block may include an edge or object boundary. In some implementations, block based coding efficiency may be improved by partitioning blocks that include multiple areas with distinct characteristics into one or more partitions, which may be rectangular, including square, partitions, corresponding to the distinct content, and encoding the partitions rather than encoding each minimum coding unit independently.

In some implementations, video coding using partitioning may include selecting a partitioning scheme from among multiple candidate partitioning schemes. For example, in some implementations, candidate partitioning schemes for a 64×64 coding unit may include rectangular size partitions ranging in sizes from 4×4 to 64×64, such as 4×4, 4×8, 8×4, 8×8, 8×16, 16×8, 16×16, 16×32, 32×16, 32×z32, 32×64, 64×32, or 64×64. In some implementations, video coding using partitioning may include a full partition search, which may include selecting a partitioning scheme by encoding the coding unit using each available candidate partitioning scheme and selecting the best scheme, such as the scheme that produces the least rate-distortion error. In some implementations of video coding using partitioning, such as offline two-pass encoding, information regarding motion between frames may be generated in a first coding pass, and may be utilized to select a partitioning scheme in a second coding pass. Techniques such as offline two-pass encoding and evaluating rate-distortion error, or other similar metrics, for each candidate partitioning scheme, may be time-consuming, and may utilize more than half of the encoding time. In some implementations, such as video conferencing or other content that includes a static background, a partitioning scheme may be selected based on the difference between previous and current source frames. In some implementations, encoding a video frame using motion-compensated partitioning may identify a partitioning scheme more efficiently than full partition searching, offline two-pass encoding, or partitioning based on inter-frame differences.

In some implementations, encoding a video frame using motion-compensated partitioning may include identifying a partitioning scheme for encoding a current block, such as block 610. In some implementations, identifying a partitioning scheme may include determining whether to encode the block as a single partition of maximum coding unit size, which may be 64×64 as shown, or to partition the block into multiple partitions, which may correspond with the sub-blocks, such as the 32×32 blocks 620 the 16×16 blocks 630, or the 8×8 blocks 640, as shown, and may include determining whether to partition into one or more smaller partitions. For example, a 64×64 block may be partitioned into four 32×32 partitions. Three of the four 32×32 partitions may be encoded as 32×32 partitions and the fourth 32×32 partition may be further partitioned into four 16×16 partitions. Three of the four 16×16 partitions may be encoded as 16×16 partitions and the fourth 16×16 partition may be further partitioned into four 8×8 partitions, each of which may be encoded as an 8×8 partition. In some implementations, identifying the partitioning scheme may include using a partitioning decision tree.

Figure 7:
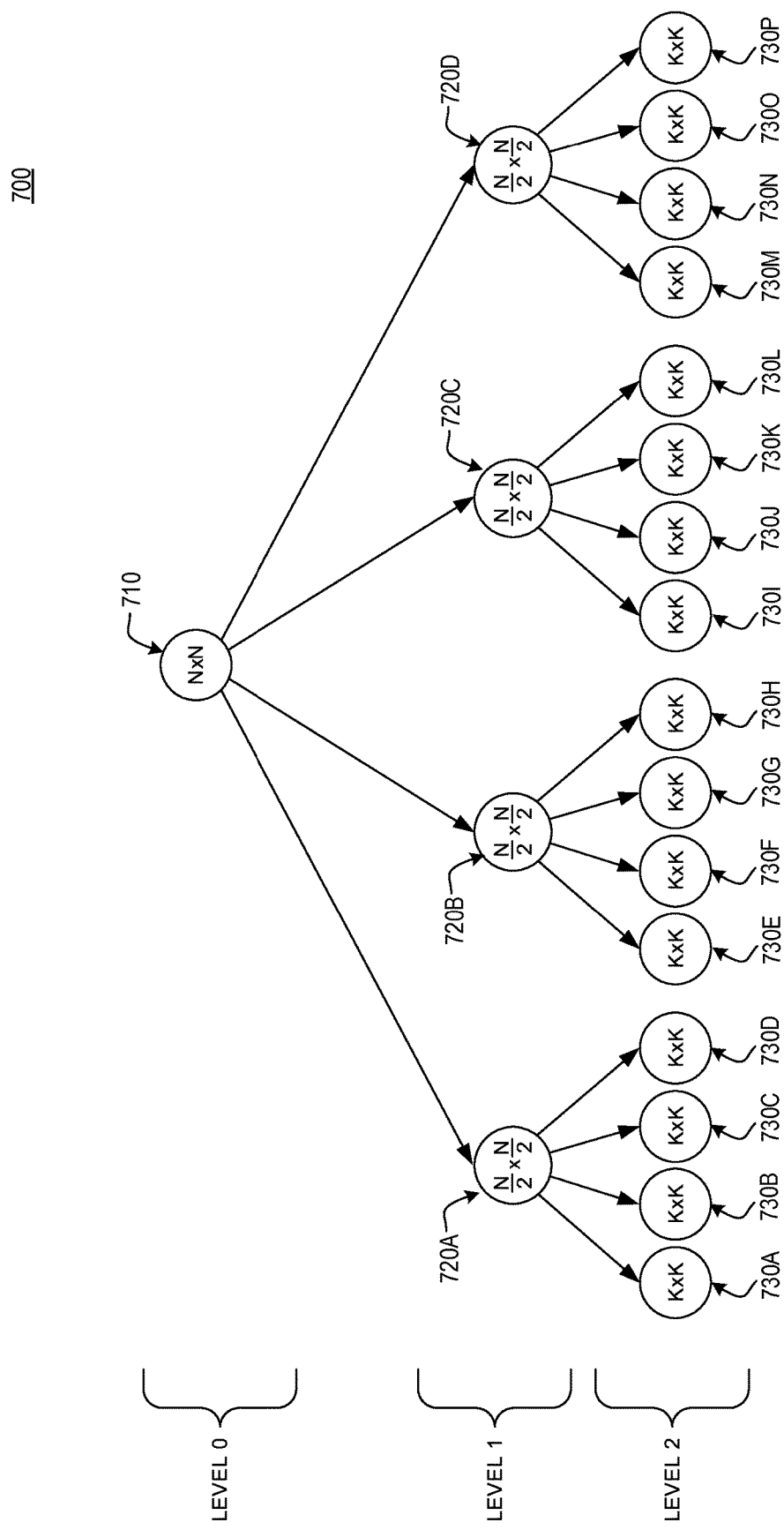
FIG. 7 is a diagram of an example of a partitioning decision tree in accordance with implementations of this disclosure.

FIG. 7 is a diagram of an example of a partitioning decision tree in accordance with implementations of this disclosure. In some implementations, a partitioning decision tree 700 may represent multiple candidate partitioning schemes for a block, such as a 64×64 block 610 shown in FIG. 6. Although the partitioning decision tree shown in FIG. 7 includes nodes representing square partitions, in some implementations, a partitioning decision tree may represent all possible rectangular, including square, partitions for a block.

As shown in FIG. 7, a partitioning decision tree 700 may include a node 710/720/730, as indicated by a circle, representing each candidate partition for a block. For example, as shown, FIG. 7 includes a first, or root, node 710, which may represent an N×N partition, which may correspond with the current coding unit or block. In some implementations, the root node 710 may be a partitioning level 0 node. The N×N root partition may be partitioned into multiple partitions, such as N/2×N/2 partitions, which may be represented as level 1, or intermediate, nodes 720, in the partitioning decision tree 700. For example, the root node 710 may represent a 64×64 block that may be partitioned into four 32×32 partitions that may be represented by the four level 1 nodes 720 shown. The smallest partition in a partitioning scheme, which may be a basic block, may be a K×K partition and may be represented by a leaf node 730. For example, the partition represented by each N/2×N/2 intermediate node 720 may be partitioned into four K×K partitions represented by leaf nodes 730 in the partitioning decision tree 700.

Figure 8:
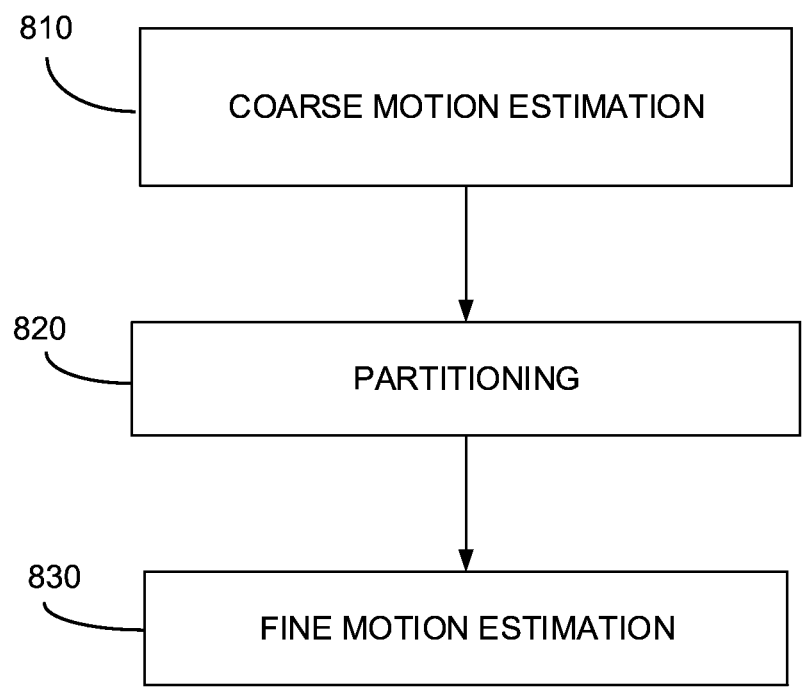
FIG. 8 is a diagram of an example of video coding using motion-compensated partitioning in accordance with implementations of this disclosure.

FIG. 8 is a diagram of an example of video coding using motion-compensated partitioning in accordance with implementations of this disclosure. Motion-compensated partitioning may be implemented in a system, such as the system 200 shown in FIG. 2. For example, motion-compensated partitioning can be implemented, as a software program that may be executed by a computing device, such as computing and communication devices 100A/100B/100C shown in FIG. 1. The software program can include machine-readable instructions that are stored in a memory such as memory 150 that, when executed, such as by a processor 140, may cause the computing device to perform motion-compensated partitioning. Motion-compensated partitioning can also be implemented using hardware in whole or in part. As explained above, some computing devices may include multiple memories and multiple processors, and motion-compensated partitioning may be distributed using one or more processors and one or more memories on one or more physical devices. In some implementations, motion-compensated partitioning may include coarse motion estimation at 810, partitioning at 820, fine motion estimation at 830, or a combination thereof. In some implementations, video coding, such as the video coding shown in FIG. 4, may include motion-compensated partitioning. For example, the intra/inter prediction 410 shown in FIG. 4 may include motion-compensated partitioning.

In some implementations, coarse motion estimation may be performed at 810. In some implementations, coarse motion estimation may be performed for each block in a current frame. For example, a current block of a current frame may be a 64×64 block (N=64), such as block 610 shown in FIG. 6. In some implementations, coarse motion estimation may include dividing the current block into multiple sub-blocks, which may be K×K basic blocks. In some implementations, the size of the basic blocks may correspond with the smallest available partition size. For example, encoding high definition video, such as a 720p video, may include using a basic block size of K=16, such as block 630 as shown in FIG. 6. In another example, encoding standard definition video may include using a basic block size of K=8.

Although square blocks and sub-blocks are described herein for simplicity, non-square blocks, sub-blocks, or both, can be used. Any combination of sub-block sizes and shapes can be used. In some implementations, each sub-block may be included in one and only one parent sub-block and all of the pixels of the block may be included in at least one sub-block. In some implementations, the available block and sub-block sizes may be indicated in a data structure, such as an enum. For example, a enum data structure, or type, describing a set of available block sizes may be expressed as follows:

(Expression 1)

```
typedef enum BLOCK_SIZE {
    4x4,
    4x8,
    8x4,
    8x8,
    8x16,
    16x8,
    16x16,
    16x32,
    32x16,
    32x32,
    32x64,
    64x32,
    64x64
} BLOCK_SIZE.
```

In some implementations, coarse motion estimation may include generating motion information, such as one or more motion vectors, and prediction error, or residual, information, for each basic block. In some implementations, coarse motion estimation can include generating motion and prediction error information at full pixel resolution. In some implementations, coarse motion estimation may be performed for each K×K basic block of the current N×N block of the current video frame in raster scan order. In some implementations, coarse motion estimation may include performing a motion search to find the best matching block from a search area in one or more reference frames. In some implementations, a motion vector from a neighboring block or sub-block can be used to identify a search area for performing coarse motion estimation for a current block. In some implementations, coarse motion estimation may include performing full-pixel motion searching for the current coding unit, which may be a K×K basic block, using a search method, such as a center-biased hex search or a diamond-pattern search. In some implementations, coarse motion estimation may include finer than full-pixel motion searching. In some implementations, the prediction error information may be a measure of the difference, such as a sum of absolute differences (SAD) or a sum of squared differences (SSD), between the current block and a reference block in a reference frame as indicated by the motion information. In some implementations, coarse motion estimation may include storing the motion information and prediction error information for each basic block of the current block of the current frame.

In some implementations, the current block may be partitioned at 820. In some implementations, partitioning the current block may include generating a partitioning decision tree, such as the partitioning decision tree 700 shown in FIG. 7.

In some implementations, a node may be represented in a data structure, such as a struct. In some implementations, node information regarding the node may be included in the data structure for the node. For example, the node information may include the partition size (BlockSize) of the node, which may be a value from the data structure shown in Expression 1. In some implementations, the node information may include motion information, such as the motion information generated at 810. For example, the node information may include an x, horizontal, or row component (MV_Row) of the motion vector, a y, vertical, or column component (MV_Col) of the motion vector, or both. In another example, the node information may include prediction error information (PredErr) for the partition represented by the node, which may be the SAD or SSD. In some implementations, the node information may include partitioning information (PatitionDecision) indicating whether to partition the partition represented by the node. In some implementations, the partitioning information for a leaf node, representing a basic block size partition, may indicate that the node is not partitioned (NON-SPLIT). In some implementations, the node information may include information associating the node with another node, such as a child node. For example, the node information may include a child node data structure (ChildNodes[ ]), which may include a reference, or pointer, to data structures representing the child nodes. For example, a node information (node_info) struct data structure describing a node may be expressed as follows:

---
(Expression 2)

struct node_info {
   BLOCK_SIZE BlockSize;
   short MV_Row;
   short MV_Col;
   uint64_t PredErr;
   DECISION_TYPE PartitionDecision;
   struct node_info *ChildNodes[4];
};
---

In some implementations, partitioning information (PartitionDecision) may be represented by a data structure. For example, a partitioning information enum data structure, or type, may be expressed as follows:

---
(Expression 3)

typedef enum DECISION_TYPE {
   NONSPLIT,
   SPLIT
} DECISION_TYPE.
---

In some implementations, generating the partitioning decision tree may include traversing the partitioning decision tree. For example, the partitioning decision tree may be traversed in a traversal order, such as a post-order depth-first traversal order. In a post-order depth-first traversal order, each child node, beginning with the leaf nodes representing the basic block partitions, may be evaluated before a respective parent node. For example, referring to FIG. 7, nodes 730A-D may be evaluated before node 720A, and nodes 720A-D may be evaluated before node 710.

In some implementations, traversing the partitioning decision tree may include evaluating partitioning criteria for each node. For example, the partitioning criteria may include an allows-larger-partition criterion, a valid-prediction criterion, a motion-similarity criterion, or a combination thereof. In some implementations, the partitioning criteria may be evaluated recursively, from the bottom up, for each node of the partitioning decision tree.

In some implementations, evaluating partitioning criteria may include evaluating an allows-larger-partition criterion. Evaluating an allows-larger-partition criterion may include determining whether the partitioning information (PartitionDecision) for each child node of a current node indicates no partitioning (NON-SPLIT) for the child node. In some implementations, the partitioning information for each child node may indicate no partitioning and an allows-larger-partition criterion may be true. For example, a node may have four child nodes, the partitioning information for three of the four child nodes may indicate no partitioning, the partitioning information for the fourth child node may indicate partitioning (SPLIT), and the allows-larger-partition criterion may evaluate to false.

In some implementations, evaluating partitioning criteria may include evaluating a valid-prediction criterion. Evaluating a valid-prediction criterion may include determining whether the prediction error information (PredErr) for each child node of the current node is within a prediction error threshold for the respective partition level (T_err_level_i). For example, a level i−1 node may have four level i child nodes, the prediction error information for three of the four child nodes may be within the prediction error threshold for level i, the partitioning information for the fourth child node may exceed the prediction error threshold for level i, and the valid-prediction criterion may evaluate to false.

In some implementations, evaluating partitioning criteria may include evaluating a motion-similarity criterion. In some implementations, evaluating a motion-similarity criterion may include determining whether a motion difference for each child node of the current node is within a motion similarity threshold, or full-pixel motion vector threshold, for the respective partition level (T_mv_level_i).

In some implementations, the motion difference for a child node may be the absolute value of the difference between the row motion vector component (MV_Row) for the child node and an average row motion vector component (AVG_MV_Row) for the child nodes, and may be expressed as the following:

$$|MV\_Row - AVG\_MV\_Row| < T\_mv\_level\_i. \quad \text{(Expression 4)}$$

In some implementations, the motion difference for a child node may be the absolute value of the difference between the column motion vector component (MV_Col) for the child node and an average column motion vector component (AVG_MV_Col) for the child nodes, and may be expressed as the following:

$$|MV\_Col - AVG\_MV\_Col| < T\_mv\_level\_i. \quad \text{(Expression 5)}$$

In some implementations, determining whether the motion difference for each child node of the current node is within the motion similarity threshold may include determining whether a row motion difference is within the threshold, determining whether a column motion difference is within the threshold, or determining whether both the row and the column motion difference are within the threshold.

For example, a level i−1 node may have four level i child nodes, the row and column motion vector components for three of the four child nodes may be within the motion similarity threshold for level i, the row motion vector component for the fourth child node may be within the motion similarity threshold for level i, the column motion vector component for the fourth child node may exceed the motion similarity threshold for level i, and the motion-similarity criterion may evaluate to false.

In some implementations, traversing the partitioning decision tree may include populating, or updating, node information for the current node based on the evaluation of the partitioning criteria. For example, each of the partitioning criteria may evaluate to true, which may indicate a high likelihood that the content included in each of the child partitions corresponds with adjacent portions of a moving object captured by the video stream, and the partitions represented by the child nodes may be merged, such that partition size represented by the current node may be the smallest partition size for the respective branch of the partitioning decision tree. In some implementations, populating, or updating, the node information for the current node may include indicating a block size (BlockSize) information, row motion component (MV_Row) information, column motion component (MV_Col) information, prediction error (PredErr) information, partitioning (PatitionDecision) information, or a combination thereof, for the current node.

For example, a current node at level i−1 may have four child nodes at level I, the partitioning criteria may evaluate to true, the block size (BlockSize) information for the current node may be set to $(N/2^{i-1})\times(N/2^{i-1})$, the row motion component (MV_Row) information for the current node may be set to the average row motion vector component (AVG_MV_Row) for the child nodes, the column motion component (MV_Col) information for the current node may be set to the average column motion vector component (AVG_MV_Row) for the child nodes, the prediction error (PredErr) information for the current node may be set to the sum, or an average, of the prediction error information for the child nodes, and the partitioning (PatitionDecision) information for the current node may be set to indicate no partitioning (NON-SPLIT) for the current node.

In another example, one or more of the partitioning criteria may evaluate to false, the block size (BlockSize) information may be set to $(N/2^{i-1})\times(N/2^{i-1})$, the row motion component (MV_Row) information for the current node may be set to an invalid, or false, value (INVALID), the column motion component (MV_Col) information for the current node may be set to an invalid, or false, value, the prediction error (PredErr) information for the current node may be set to an invalid, or false, value, and the partitioning (PatitionDecision) information for the current node may be set to indicate partitioning (SPLIT) for the current node.

In some implementations, traversing the partitioning decision tree may include pruning the partitioning decision tree. In some implementations, pruning the partitioning decision tree may include determining whether the partitioning information for a current node indicates no partitioning (NON-SPLIT) for the current node and removing any nodes descending from the current node from the partitioning decision tree. In some implementations, pruning the partitioning decision tree may be performed top-down, from the root node to the leaf nodes, after traversing the partitioning decision tree. In some implementations, the pruned partitioning decision tree may indicate a selected partitioning scheme, which may be an optimal partitioning scheme, for the current block.

In some implementations, fine motion estimation may be performed at 830. For example, fine motion estimation may include sub-pixel motion estimation, such as sub-pixel motion searching, which may identify a high-precision matching block for each partition in the selected partitioning scheme. In some implementations, sub-pixel motion searching for a current block may include depth-first traversing of the selected partitioning scheme for the current block. In some implementations, sub-pixel motion estimation for sibling nodes, which may be level i nodes having a common level i−1 parent node, may be performed in raster scan order, such that blocks above or to the left of a current partition may be searched before the current partition. For example, referring to the partitioning decision tree 700 shown in FIG. 7, the root node 710 may represent a 64×64 partition, intermediate node 720A may represent a 32×32 partition in the top left corner of the 64×64 partition, leaf node 730A may represent a 16×16 partition in the top left corner of the 32×32 partition, leaf node 730B may represent a 16×16 partition in the top right corner of the 32×32 partition, leaf node 730C may represent a 16×16 partition in the bottom left corner of the 32×32 partition, leaf node 730D may represent a 16×16 partition in the bottom right corner of the 32×32 partition, and sub-pixel motion estimation may be performed for the partition represented by leaf node 730A, followed by sub-pixel motion estimation for the partition represented by leaf node 730B, followed by sub-pixel motion estimation for the partition represented by leaf node 730C, followed by sub-pixel motion estimation for the partition represented by leaf node 730D.

In some implementations, sub-pixel motion estimation for a current partition may include processing the node information for the node representing the current partition, centering a sub-pixel motion search grid in a reference frame based on the node information, and identifying a portion of the reference frame that best matches the current partition. In some implementations, centering the sub-pixel motion search grid may include centering the sub-pixel motion search grid based on the full-pixel motion information (MV_Row, MV_Col) for the partition. In some implementations, the sub-pixel motion searching may find the closest match between the partition and a portion of the reference frame at ½, ¼, or ⅛ pixel precision.

In some implementations, fine motion estimation may include identifying a selected prediction mode for the current partition. For example, the selected prediction mode may be identified from one or more candidate intra-prediction modes, one or more candidate inter-prediction modes, or a combination of intra-prediction modes and inter-prediction modes. In some implementations, identifying the selected prediction mode may include generating a prediction mode metric for one or more of the candidate prediction modes. For example, the prediction mode metric may be a rate-distortion (RD) error metric, and the prediction mode having the lowest RD error may be the selected prediction mode. In some implementations, identifying the selected prediction mode may be performed in parallel with the sub-pixel motion estimation. In some implementations, the prediction error (PredErr) for a block may be below an inter-mode threshold (T_inter_mode), which may be a relatively small value, intra-prediction modes may be omitted, and the selected prediction mode may be identified from candidate inter-prediction modes.

Aspects of motion-compensated partitioning as disclosed herein can speed up real time encoding of video streams and is especially suitable for the real time encoding of video conferencing applications on mobile devices.

Other implementations of motion-compensated partitioning are available. In implementations, additional elements of motion-compensated partitioning can be added, certain elements can be combined, and/or certain elements can be removed. For example, the partitioning decision tree may be generated before performing coarse motion estimation, or pruning the partitioning decision tree may be performed independently of generating the partitioning decision tree.

Figure 9:
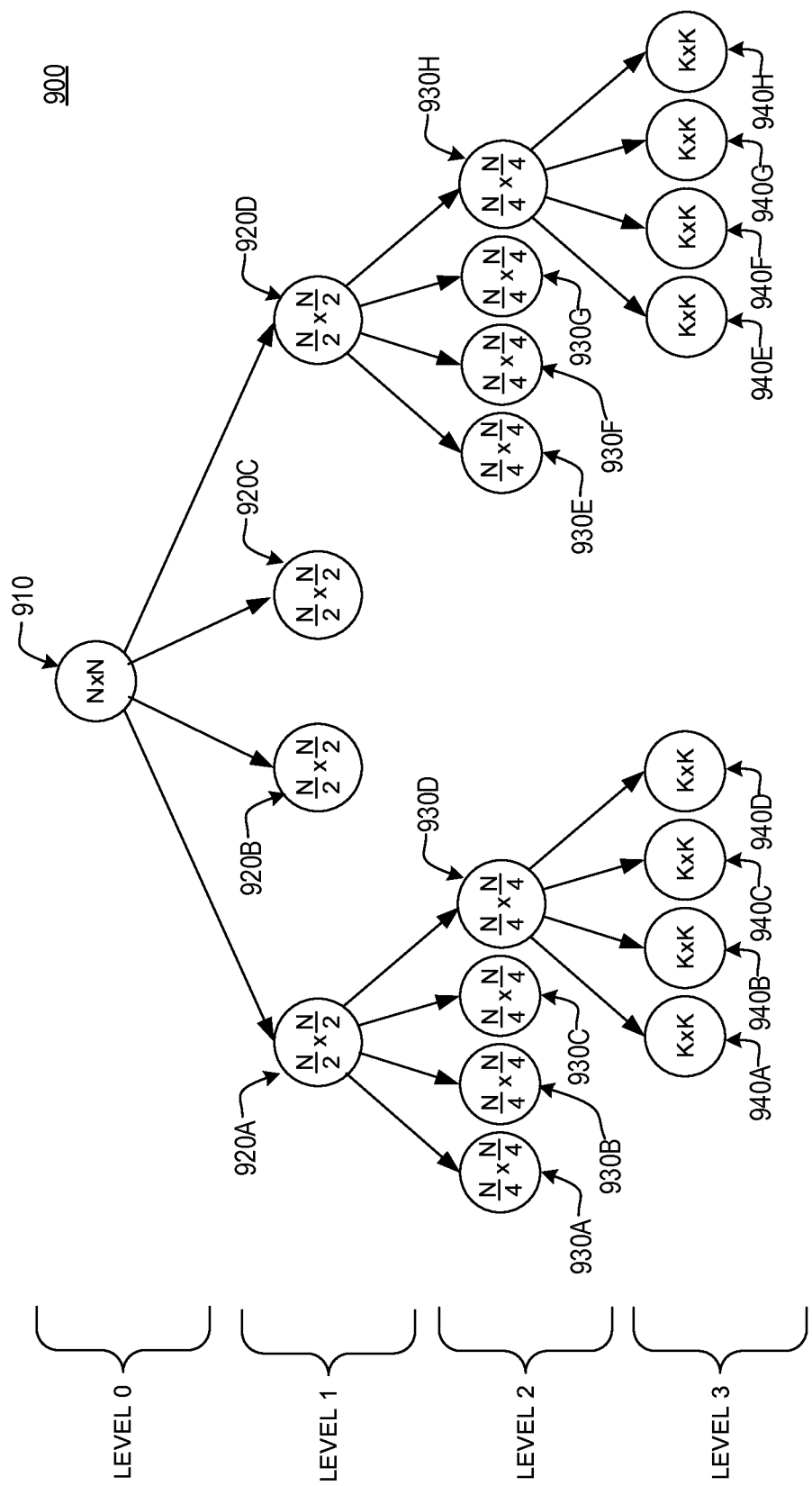
FIG. 9 is a diagram of an example of a pruned partitioning decision tree for a block in accordance with implementations of this disclosure.
Figure 10:
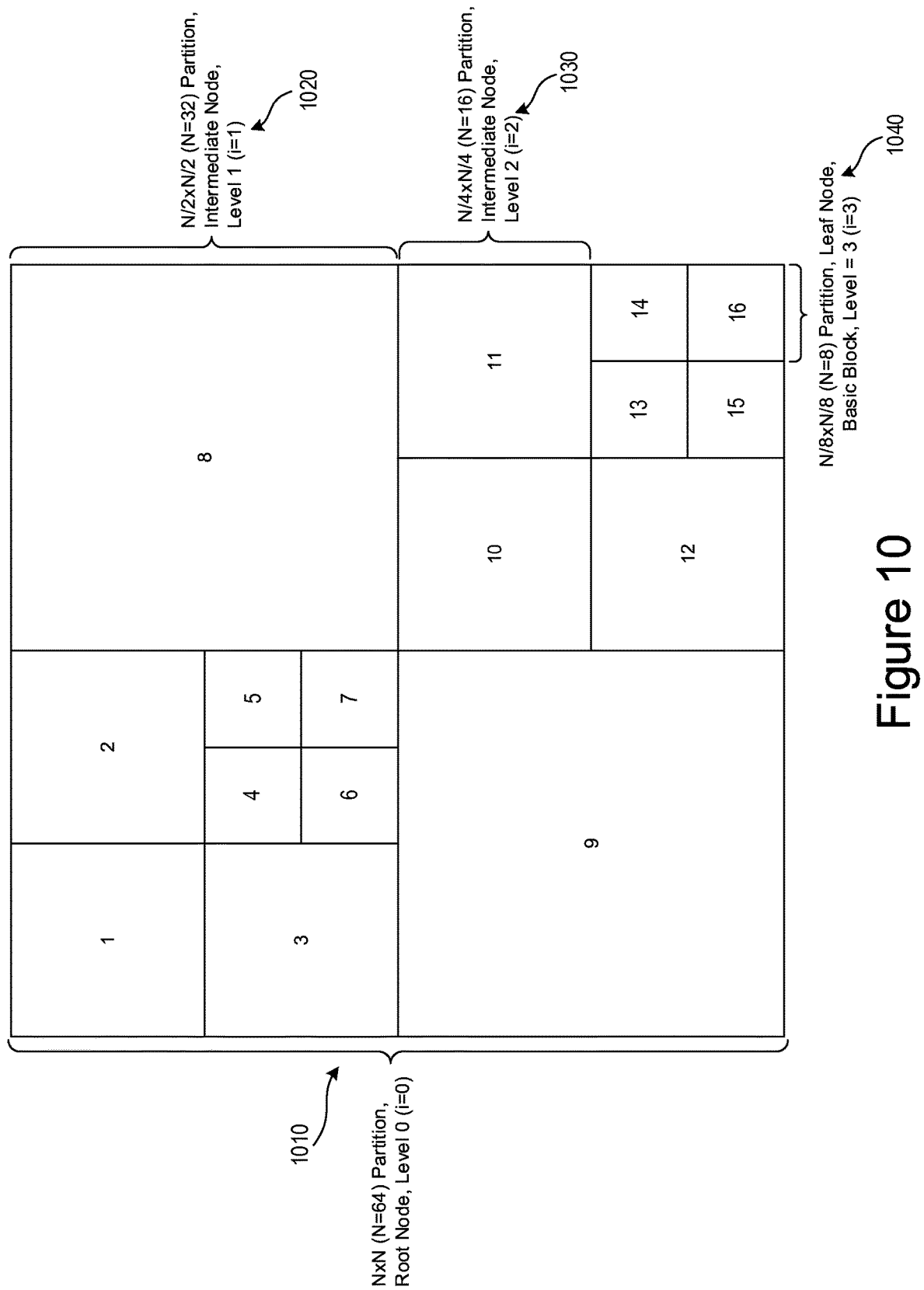
FIG. 10 is a diagram of an example of block partitioning in raster scan order in accordance with implementations of this disclosure.

FIGS. 9 and 10 show examples of a partitioning decision tree and processing of partitioned blocks corresponding to the partitioning decision tree in raster scan order. As shown, the coding block size is 64×64 (N=64) and the basic block size is 8×8 (K=8).

FIG. 9 is a diagram of an example of a pruned partitioning decision tree for a block in accordance with implementations of this disclosure. As shown, the pruned partitioning decision tree includes an N×N (N=64) root node 910. The node information for the root node 910 may include partitioning information indicating partitioning (SPLIT), and the root node 910 may include four level 1 32×32 intermediate nodes 920. The node information for the first level 1 intermediate node 920A may include partitioning information indicating partitioning (SPLIT), and the first level 1 intermediate node 920A may include four level 2 16×16 intermediate nodes 930A-D. The node information for the second and third level 1 intermediate nodes 920B-C may include partitioning information indicating no partitioning (NON-SPLIT). The node information for the fourth level 1 intermediate node 920D may include partitioning information indicating partitioning (SPLIT), and the fourth level 1 intermediate node 920D may include four level 2 16×16 intermediate nodes 930E-H. The node information for the first, second, and third level 2 intermediate nodes 930A-C may include partitioning information indicating no partitioning (NON-SPLIT). The node information for the fourth level 2 intermediate node 930D may include partitioning information indicating partitioning (SPLIT), and the fourth level 2 intermediate node 930D may include four level 3 K×K (K=8) leaf nodes 940A-D. The node information for the fifth, sixth, and seventh level 2 intermediate nodes 930E-G may include partitioning information indicating no partitioning (NON-SPLIT). The node information for the eighth level 2 intermediate node 930H may include partitioning information indicating partitioning (SPLIT), and the eighth level 2 intermediate node 930H may include four level 3 K×K (K=8) leaf nodes 940E-H. The node information for the level 3 leaf nodes 940A-H may include partitioning information indicating no partitioning (NON-SPLIT).

FIG. 10 is a diagram of an example of block partitioning in raster scan order in accordance with implementations of this disclosure. In some implementations, a partitioning scheme may be processed in raster scan order, from left to right and from top to bottom. As shown in FIG. 10, a 64×64 partition 1010, which may be represented by the root node 910 as shown in FIG. 9, may be processed.

The node information for the partition 1010 corresponding to the root node 910, which may be the coding unit partition, may include partitioning information indicating partitioning (SPLIT), and processing the partition 1010 may include processing each child partition 1020 within the current partition in raster scan order. For example, the 32×32 partition in the upper left corner, which may correspond to the first level 1 intermediate node 920A, may be processed first.

The node information for the 32×32 partition in the upper left corner, which may correspond to the first level 1 intermediate node 920A may include partitioning information indicating partitioning (SPLIT), and processing the partition 1020 may include processing each child partition 1030 within the partition 1020 in raster scan order. For example, the 16×16 partition 1030 in the upper left corner, which may correspond to the first level 2 intermediate node 930A, may be processed first.

The node information for the 16×16 partition 1030 in the upper left corner, which may correspond to the first level 2 intermediate node 930A may include partitioning information indicating no partitioning (NON-SPLIT), and processing the partition may be completed in raster scan order position 1. The node information for the 16×16 partition 1030 in the upper right corner, which may correspond to the second level 2 intermediate node 930B may include partitioning information indicating no partitioning (NON-SPLIT), and processing the partition may be completed in raster scan order position 2. The node information for the 16×16 partition 1030 in the bottom left corner, which may correspond to the third level 2 intermediate node 930C may include partitioning information indicating no partitioning (NON-SPLIT), and processing the partition may be completed in raster scan order position 3. The node information for the 16×16 partition 1030 in the bottom right corner, which may correspond to the fourth level 2 intermediate node 930D may include partitioning information indicating partitioning (SPLIT), and processing the partition 1030 may include processing each child partition 1040 within the partition 1030 in raster scan order. For example, the 8×8 partition 1040 in the upper left corner, which may correspond to the first level 3 intermediate node 940A, may be processed first.

The node information for the 8×8 partition 1040 in the upper left corner, which may correspond to the first level 3 intermediate node 940A may include partitioning information indicating no partitioning (NON-SPLIT), and processing the partition may be completed in raster scan order position 4. The node information for the 8×8 partition 1040 in the upper right corner, which may correspond to the second level 3 intermediate node 940B may include partitioning information indicating no partitioning (NON-SPLIT), and processing the partition may be completed in raster scan order position 5. The node information for the 8×8 partition 1040 in the bottom left corner, which may correspond to the third level 3 intermediate node 940C may include partitioning information indicating no partitioning (NON-SPLIT), and processing the partition may be completed in raster scan order position 6. The node information for the 8×8 partition 1040 in the bottom right corner, which may correspond to the fourth level 3 intermediate node 940D may include partitioning information indicating no partitioning (NON-SPLIT), and processing the partition may be completed in raster scan order position 7.

The node information for the 32×32 partition in the upper right corner, which may correspond to the second level 1 intermediate node 920B may include partitioning information indicating no partitioning (NON-SPLIT), and processing the partition may be completed in raster scan order position 8.

The node information for the 32×32 partition in the lower left corner, which may correspond to the third level 1 intermediate node 920C may include partitioning information indicating no partitioning (NON-SPLIT), and processing the partition may be completed in raster scan order position 9.

The node information for the 32×32 partition in the lower right corner, which may correspond to the fourth level 1 intermediate node 920D may include partitioning information indicating partitioning (SPLIT), and processing the partition 1020 may include processing each child partition 1030 within the partition 1020 in raster scan order. For example, the 16×16 partition 1030 in the upper left corner, which may correspond to the fifth level 2 intermediate node 930E, may be processed first.

The node information for the 16×16 partition 1030 in the upper left corner, which may correspond to the fifth level 2 intermediate node 930E may include partitioning information indicating no partitioning (NON-SPLIT), and processing the partition may be completed in raster scan order position 10. The node information for the 16×16 partition 1030 in the upper right corner, which may correspond to the sixth level 2 intermediate node 930F may include partitioning information indicating no partitioning (NON-SPLIT), and processing the partition may be completed in raster scan order position 11. The node information for the 16×16 partition 1030 in the bottom left corner, which may correspond to the seventh level 2 intermediate node 930G may include partitioning information indicating no partitioning (NON-SPLIT), and processing the partition may be completed in raster scan order position 12. The node information for the 16×16 partition 1030 in the bottom right corner, which may correspond to the eighth level 2 intermediate node 930H may include partitioning information indicating partitioning (SPLIT), and processing the partition 1030 may include processing each child partition 1040 within the partition 1030 in raster scan order. For example, the 8×8 partition 1040 in the upper left corner, which may correspond to the fifth level 3 intermediate node 940E, may be processed first.

The node information for the 8×8 partition 1040 in the upper left corner, which may correspond to the fifth level 3 intermediate node 940E may include partitioning information indicating no partitioning (NON-SPLIT), and processing the partition may be completed in raster scan order position 13. The node information for the 8×8 partition 1040 in the upper right corner, which may correspond to the sixth level 3 intermediate node 940F may include partitioning information indicating no partitioning (NON-SPLIT), and processing the partition may be completed in raster scan order position 14. The node information for the 8×8 partition 1040 in the bottom left corner, which may correspond to the seventh level 3 intermediate node 940G may include partitioning information indicating no partitioning (NON-SPLIT), and processing the partition may be completed in raster scan order position 15. The node information for the 8×8 partition 1040 in the bottom right corner, which may correspond to the eighth level 3 intermediate node 940H may include partitioning information indicating no partitioning (NON-SPLIT), and processing the partition may be completed in raster scan order position 16.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a general purpose computer or general purpose/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
identifying a current block of a current frame of an input video stream;
generating, by a processor in response to instructions stored on a non-transitory computer readable medium, an encoded block by encoding the current block, wherein encoding the current block includes motion-compensated partitioning the current block, wherein motion-compensated partitioning the current block includes:
   generating coarse motion estimation information for the current block;
   partitioning the current block, wherein partitioning the current block includes:
      determining a partitioning scheme from a plurality of candidate partitioning schemes, wherein each candidate partitioning scheme from the plurality of candidate partitioning schemes includes at least one candidate partition from a plurality of candidate partitions for the current block, wherein determining the partitioning scheme includes generating a partitioning decision tree including a plurality of nodes, wherein each node from the plurality of nodes represents a candidate partition from the plurality of candidate partitions; and
      partitioning the current block using the partitioning scheme; and
   generating fine motion estimation information for the current block; and
transmitting or storing the encoded block.

2. The method of claim 1, wherein determining the partitioning scheme includes traversing the partitioning decision tree in a depth-first order, wherein traversing the partitioning decision tree in a depth-first order includes:
   identifying a first node from the plurality of nodes, the first node having a plurality of child nodes from the plurality of nodes, wherein each child node is a leaf node, each leaf node representing a respective basic block size partition from the plurality of candidate partitions; and
   determining node information for the first node by evaluating a plurality of partitioning criteria based on each child node from the plurality of child nodes, wherein determining the node information for the first node includes:
      using an average of a horizontal component of motion information of each child node as a horizontal component of motion information for the first node, using an average of a vertical component of motion information of each child node as a vertical component of motion information for the first node, using a sum of a prediction error value of each child node as a prediction error value for the first node, and using a value of no partitioning for partitioning information for the first node, on a condition that partitioning information for each respective child node has a no partitioning value, on a condition that prediction error information for each respective child node is within a corresponding prediction error threshold, on a condition that a horizontal motion difference for each respective child node is within a corresponding horizontal motion similarity threshold, and on a condition that a vertical motion difference for each respective child node is within a corresponding vertical motion similarity threshold; and
      using an invalid value as a horizontal component of motion information for the first node, using an invalid value as a vertical component of motion information for the first node, using invalid value as a prediction error value for the first node, and using a value of partitioning for partitioning information for the first node, on a condition that partitioning information for a child node has a partitioning value, on a condition that prediction error information for a child node exceeds the corresponding prediction error threshold, on a condition that a horizontal motion difference for a child node exceeds the corresponding horizontal motion similarity threshold, or on a condition that a vertical motion difference for a child node exceeds the corresponding vertical motion similarity threshold.

3. A method comprising:
identifying a current block of a current frame of an input video stream;
generating, by a processor in response to instructions stored on a non-transitory computer readable medium, an encoded block by encoding the current block, wherein encoding the current block includes:
   generating coarse motion estimation information for the current block, wherein the current block is a N×N size block, and wherein generating coarse motion estimation information for the current block includes:
      dividing the current block into a plurality of K×K basic blocks, where N is a multiple of K; and
      generating motion information and prediction error information for each respective basic block from the plurality of basic blocks by performing coarse motion searching for each respective basic block,
   determining a partitioning scheme from a plurality of candidate partitioning schemes, wherein each candidate partitioning scheme from the plurality of candidate partitioning schemes includes at least one candidate partition from a plurality of candidate partitions for the current block, wherein determining the partitioning scheme includes:
      generating a partitioning decision tree including a plurality of nodes, wherein each node from the plurality of nodes represents a candidate partition from the plurality of candidate partitions; and
      traversing the partitioning decision tree in a depth-first order, wherein traversing the partitioning decision tree in a depth-first order includes:
         identifying a first node from the plurality of nodes, the first node having a plurality of child nodes from the plurality of nodes, wherein each child node is a leaf node, each leaf node representing a respective basic block size partition from the plurality of candidate partitions,
         determining node information for the first node by evaluating a plurality of partitioning criteria based on each child node from the plurality of child nodes, wherein determining the node information for the first node includes:
            using an average of a horizontal component of motion information of each child node as a horizontal component of motion information for the first node, using an average of a vertical component of motion information of each child node as a vertical component of motion information for the first node, using a sum of a prediction error value of each child node as a prediction error value for the first node, and using a value of no partitioning for partitioning information for the first node, on a condition that partitioning information for each respective child node has a no partitioning value, on a condition that prediction error information for each respective child node is within a corresponding prediction error threshold, on a condition that a horizontal motion difference for each respective child node is within a corresponding horizontal motion similarity threshold, and on a condition that a vertical motion difference for each respective child node is within a corresponding vertical motion similarity threshold; and using an invalid value as a horizontal component of motion information for the first node, using an invalid value as a vertical component of motion information for the first node, using invalid value as a prediction error value for the first node, and using a value of partitioning for partitioning information for the first node, on a condition that partitioning information for a child node has a partitioning value, on a condition that prediction error information for a child node exceeds the corresponding prediction error threshold, on a condition that a horizontal motion difference for a child node exceeds the corresponding horizontal motion similarity threshold, or on a condition that a vertical motion difference for a child node exceeds the corresponding vertical motion similarity threshold, and pruning the partitioning decision tree, wherein pruning the partitioning decision tree includes removing a child node of the first node on a condition that partitioning information for the first node indicates no partitioning for the first node, partitioning the current block using the partitioning scheme, and generating fine motion estimation information for the current block, wherein generating fine motion estimation information for the current block includes:

generating sub-pixel motion information for each partition from the partitioning scheme; and determining a prediction mode for each partition from the partitioning scheme; and transmitting or storing the encoded block.

* * * * *